ial No. 142,594.

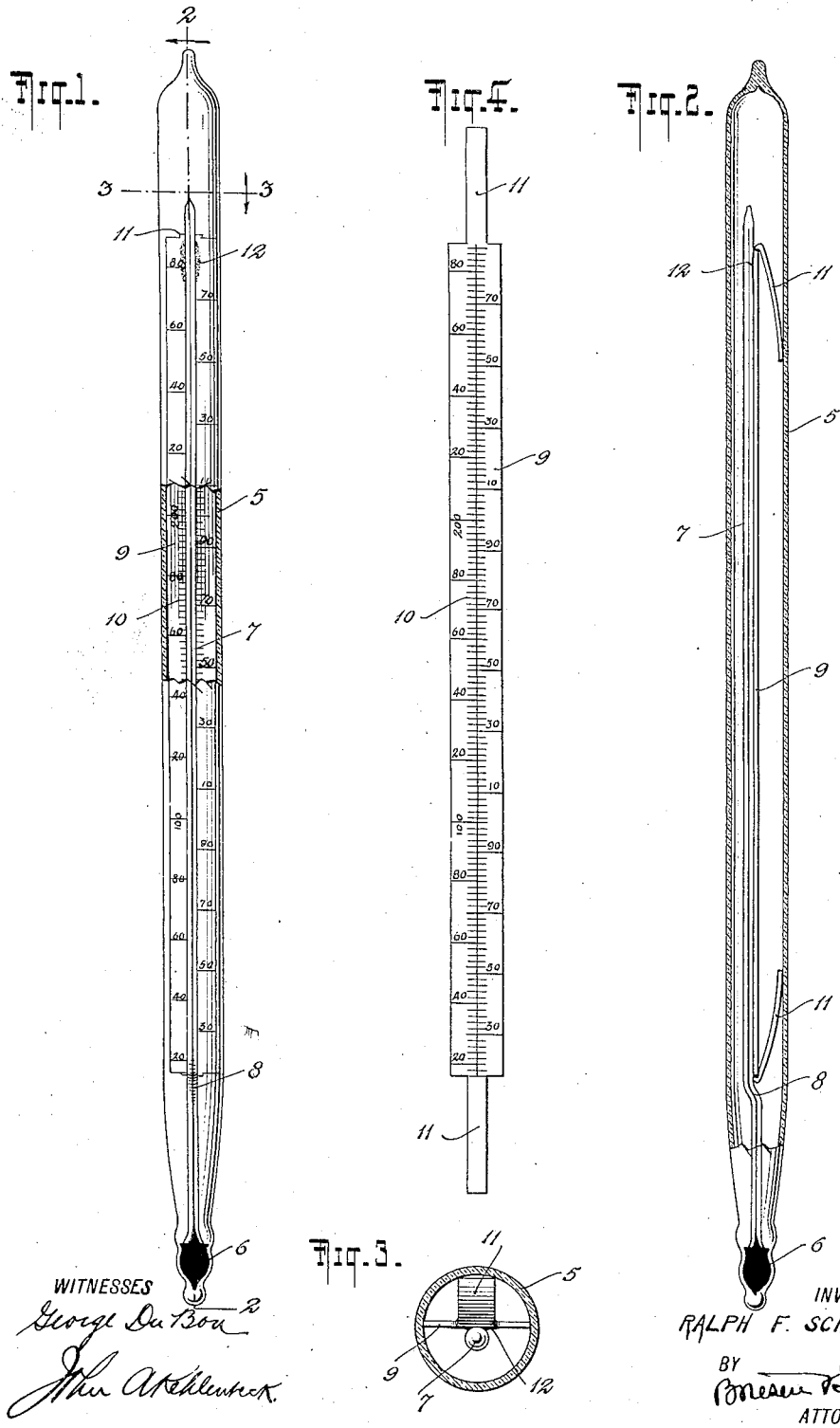

UNITED STATES PATENT OFFICE.

RALPH F. SCHNEIDER, OF BROOKLYN, NEW YORK, ASSIGNOR TO CHARLES J. TAGLIABUE MANUFACTURING CO., OF BROOKLYN, NEW YORK, A CORPORATION OF NEW YORK.

THERMOMETER.

1,348,749. Specification of Letters Patent. Patented Aug. 3, 1920.

Application filed January 16, 1917. Serial No. 142,594.

*To all whom it may concern:*

Be it known that I, RALPH F. SCHNEIDER, a citizen of the United States, and resident of the borough of Brooklyn, county of Kings, city and State of New York, have invented certain new and useful Improvements in Thermometers, of which the following is a specification.

My invention relates to thermometers and more particularly to that type thereof commonly known as insulated or glass cylinder inclosed thermometers in which the mercury tube is generally contained in a glass tube or the like. Such instruments ofttimes include a scale produced upon a strip of suitable material which in order to permit of accurate readings in a simple manner should preferably be maintained in contact with the mercury tube and against shifting in a lengthwise direction. Heretofore, owing to the limited space in each thermometer and to the length of the tube in which the work may be done, the proper location and fastening of such scales has been accomplished with difficulty and ofttimes has resulted in failure.

The particular object of my invention is to overcome these existing difficulties and objections and to provide a simple means whereby such scales may be easily and efficiently placed and secured in position regardless of any restrictions as to space or length of the insulating tube.

My improvement will be fully described hereinafter and the features of novelty will be pointed out in the appended claims.

Reference is to be had to the accompanying drawings which illustrate an example of my invention and in which Figure 1 is front elevation of a thermometer with my improvement embodied therein; Fig. 2 is a vertical section on the line 2—2 of Fig. 1; Fig. 3 is a horizontal section on the line 3—3 of Fig. 1 and Fig. 4 is a face view of the scale in its initial condition before being operatively combined with the thermometer.

As shown in the illustrated example the thermometer comprises the customary insulating or inclosing tube 5 of glass or the like which in the finished condition of the instrument is closed at its upper end. At its lower end the tube 5 is externally connected with or merges into the bulb 6 which does not communicate with the interior of the tube 5 but is in communication with the capillary tube 7 extending lengthwise of the insulating tube 5 from said bulb 6 to a point near the upper end of said tube 5 as shown in the drawings. The bulb 6 contains mercury or any other fluid which is suitable for measuring temperatures and which rises and falls in the capillary tube 7 in the customary manner, the latter being preferably provided with a bend 8 near the bulb 6 whereby the major portion of said tube 7 is located to one side of the major axis of the insulating tube 5 as shown in Fig. 2.

The instrument further comprises the scale member or strip 9 which may be constructed of cardboard or any other suitable material and upon which the scale 10 is produced, this scale being always in harmony with the purpose of the particular instrument. The scale member 9 in the illustrated example extends from the bend 8 to a point near the upper end of the capillary tube 7 and is always of a width to permit it to be placed within the tube 5 and in close proximity to or in actual contact with the capillary tube 7. In the illustrated example the scale strip 9 is provided at its opposite ends with retaining members 11 which extend toward each other at an angle to the strip 9 and have their free ends in contact with the inner surface of the insulating tube 5. These retaining members 11 may comprise integral portions of the strip 9 or they may comprise separate elements suitably secured thereto, it being understood that said members 11 may be otherwise located than at the opposite ends of the scale strip 9 although this is the preferred arrangement. When constructed as in the illustrated example the retaining members 11 are formed by cutting the material of which the strip is made to form relatively narrow end members as shown in Fig. 4, which members in use are bent backward and toward each other as shown in Fig. 2.

In all forms of the present improvement when the scale strip or member 9 is in operative position in the tube 5 the retaining members 11 or their equivalents are placed under a tension whereby said members 11 press against the tube 5 and thus press the scale member 9 into close proximity or into actual contact with the capillary tube 7 and maintain it in this position. The entire scale strip 9 is thus efficiently positioned in a simple manner it being understood that said strip is introduced into the insulating tube 5 before the upper end thereof is closed.

In order to prevent a lengthwise movement of the scale strip 9 in the insulating tube 5 the frictional engagement of the retaining members 11 may alone be relied upon or as preferred a drop of glue or other suitable material 12 may be introduced between the upper end of the capillary tube 7 and the upper end of the scale member 9. This may be readily accomplished without inconvenience owing to the fact that the parts mentioned are located near the upper end of the insulating tube 5. After the material 12 has hardened the scale strip 9 will be firmly held in position against movement in the direction of its length, while the tension or resiliency of the retaining members 11 will efficiently maintain the scale strip 9 in proper operative relation to the capillary tube 7.

After the glue or other material 12 has been introduced or after the location of the scale strip 9 has been otherwise completed, the upper end of the insulating tube 5 is closed in the usual manner.

It will be seen that my improvement provides a simple construction whereby the scale member or strip may be readily and efficiently combined with the instrument, without inconvenience or danger of failure. The present arrangement also possesses the distinct advantage that no part of the mercury tube or scale is obscured from observation as is the case in existing constructions.

Various changes in the specific construction shown and described may be made within the scope of the claims without departing from the spirit of my invention.

I claim:

1. A thermometer comprising an insulating tube, a capillary tube therein, a scale member located in coöperative relation to said capillary tube and disconnected therefrom, and retaining devices carried by said scale member in spaced relation to each other lengthwise thereof, said devices extending between the scale member and said insulating tube under tension whereby the scale member is pressed toward said capillary tube.

2. A thermometer comprising an insulating tube, a capillary tube therein, a scale member located in coöperative relation to said capillary tube, retaining members comprising integral portions of said scale member and located in spaced relation to each other lengthwise thereof, said retaining members engaging said insulating tube under tension whereby said scale member is pressed toward said capillary tube and means whereby lengthwise movement of said scale member relatively to said capillary tube is prevented.

3. A thermometer comprising an insulating tube, a capillary tube therein, a scale member located in coöperative relation to said capillary tube and retaining members located at opposite ends of said scale member and comprising integral portions thereof extending backward whereby said scale member is pressed toward said capillary tube.

4. The combination of an insulating tube, a capillary tube therein and a scale member comprising a main portion upon which the scale is produced and members forming integral extensions of said main portion and located in spaced relation to each other lengthwise thereof, the said members extending at angles to said main portion and coöperating with said insulating tube to exert pressure in directions transversely to said main portion whereby the latter is pressed into engagement with said capillary tube and maintained in operative position.

5. The combination of an insulating tube, a capillary tube therein and a scale member comprising a main portion upon which the scale is produced and integral members of less width than the main portion and extending from opposite ends thereof, said end members extending toward each other at angles to said main portion, and coöperating with said insulating tube to exert a tension whereby said main portion is pressed against said capillary tube and maintained in operative position.

6. The combination of an insulating tube, a capillary tube therein and a scale member comprising a main portion upon which a scale is produced and retaining devices carried by said main portion and located in spaced relation to each other, lengthwise thereof, said devices coöperating with one of said tubes to press the main scale portion against the other tube and maintain it in operative position.

In testimony whereof I have hereunto set my hand.

RALPH F. SCHNEIDER.